United States Patent
Fitch

Patent Number: 5,408,622
Date of Patent: Apr. 18, 1995

[54] APPARATUS AND METHOD FOR EMULATION ROUTINE CONTROL TRANSFER VIA HOST JUMP INSTRUCTION CREATION AND INSERTION

[75] Inventor: Jonathan Fitch, Cupertino, Calif.

[73] Assignee: Apple Computer, Inc., Cupertino, Calif.

[21] Appl. No.: 125,940

[22] Filed: Sep. 23, 1993

[51] Int. Cl.$^6$ ............................................. G06F 12/00
[52] U.S. Cl. ..................................... 395/375; 395/500
[58] Field of Search .......................... 395/375, 500, 800

[56] References Cited

U.S. PATENT DOCUMENTS

| | | | |
|---|---|---|---|
| 4,087,857 | 5/1978 | Joyce et al. | 395/375 |
| 4,587,612 | 5/1986 | Fisk et al. | 395/500 |
| 4,714,994 | 12/1987 | Oklobdzija et al. | 395/375 |
| 4,780,819 | 10/1988 | Kashiwagi | 395/500 |
| 4,785,392 | 11/1988 | Maier et al. | 395/375 |
| 4,812,975 | 3/1989 | Adachi et al. | 395/500 |
| 4,841,476 | 6/1989 | Mitchell et al. | 395/500 |
| 4,992,934 | 2/1991 | Portanova et al. | 395/375 |
| 5,077,657 | 12/1991 | Cooper et al. | 395/500 |
| 5,167,023 | 11/1992 | de Nicolas et al. | 395/375 |
| 5,237,664 | 8/1993 | Usami | 395/375 |

*Primary Examiner*—Parshotam S. Lall
*Assistant Examiner*—Viet Vu
*Attorney, Agent, or Firm*—Greg T. Sueoka

[57] ABSTRACT

An apparatus for emulation routine control transfer creates a jump host instruction (JHI) containing the address of a next emulation routine during the execution of a current emulation routine and outputs the JHI at the end of current emulation routine for transfer of host processor control. The apparatus preferably comprises: an emulated program counter (EPC), a summing means, a state machine, a pointer storage means, an opcode storage means, and a jump instruction circuit. The state machine is preferably coupled to control the loading of the EPC, the loading of the opcode storage means, the summing means, the pointer storage means and the operation of the jump instruction circuit. The pointer storage means is preferably coupled between the data bus and the jump instruction circuit. The state machine preferably issues commands on the control bus and directly to the summing means and the jump instruction circuit to prefetch the next emulation routine, create a jump instruction to the beginning of the next emulation routine and assert the jump instruction on the bus at the appropriate time to transfer directly from one emulation routine to the next using the single host jump instruction. The jump host instruction is placed upon the host processor's instruction bus after execution of the final instruction within a current emulation routine. Thus, the execution of the next emulation routine begins immediately after the execution of the jump host instruction, and significant amounts of processing time associated with the dispatch loop are eliminated.

19 Claims, 10 Drawing Sheets

APPARATUS AND METHOD FOR EMULATION ROUTINE CONTROL TRANSFER VIA HOST JUMP INSTRUCTION CREATION AND INSERTION

CROSS-REFERENCES TO RELATED APPLICATIONS

The present invention relates to U.S. patent application Ser. No. 08/124,315, entitled "Apparatus and Method for Emulation Routine Pointer Prefetch," filed on Sept. 20, 1993; and U.S. patent application Ser. No. 08/127,254, entitled "Apparatus and Method for Emulation Routine Instruction Issue," filed on Sept. 27, 1993.

BACKGROUND OF THE INVENTION

1. Field of the Invention

The present invention relates generally to computer instruction emulation, and more particularly to an apparatus and method for accelerating instruction emulation. Still more particularly, the present invention is an apparatus and method for transfer of control from a currently executing emulation routine to a next emulation routine.

2. Description of the Background Art

Microprocessors execute machine instructions that result in specific changes of state within the microprocessor hardware. A collection of such instructions, when properly arranged, is known as a program. Execution of a program's instructions in sequence performs a series of state changes that results in useful work, such as adding a column of figures.

Many computer architectures exist, each of which understands a specific and typically unique set of machine instructions or "language." Therefore, a program written for one architecture is useless and incomprehensible to another architecture. Since programs can require a tremendous investment of time and resources to write (hundreds of man years of skilled labor in some cases), and are limited to a single architecture, it is desirable to have a means to translate the program from one language to another. Such a translator would allow the investment made in writing programs for one architecture to be retained for writing the same program on other architectures.

Three broad solutions to the problem of architecture-specific program execution exist. These are static recompilation, dynamic recompilation, and interpretive emulation. In each case, an emulation program is written, usually on the alternative or host architecture, that translates a sequence of source program instructions intended for the source or emulated architecture into one or more instructions in the host's instruction language that perform the same function. The emulation program can be written to simulate the actions of each source program instruction individually, or to simulate the actions of several source program instructions in a single step. In general, simulation of each source program instruction individually provides greater emulation accuracy at the expense of execution speed.

In static recompilation, the emulated program is swept through in its entirety prior to execution and translated to a host program. The host program is then executed. This is rarely a complete solution since most programs exhibit dynamic behavior that cannot be predicted statically. For example, a branch instruction may depend upon a result computed by previous instructions that cannot be predicted prior to running the program. Therefore, the branch instruction cannot be translated to its meaningful counterparts in the host's language. Static recompilation also suffers from the shortcoming of requiring significant amounts of memory to store the translated copy of the program. In addition, static recompilation requires a complete understanding of the behavior of all possible programs. Thus, static recompilation is not a complete solution to effectively translating computer programs for emulation.

Dynamic recompilation allows emulation of programs that exhibit dynamic behavior such as branch instructions. In dynamic recompilation, programs are statically translated until a problem instruction (usually a branch) that cannot be accurately translated is reached. The translated program is then executed up to this point such that the architectural state of the emulated machine is updated. The problem instruction can then be emulated by the execution of an emulation routine corresponding to the problem instruction, after which static translation can begin again. This method can successfully emulate any program and is efficient if large sections of source instructions can be statically translated. However, the translator must run concurrently with the emulated program, and adds significant overhead to the emulation process. The speed and memory requirements are difficult to predict, and will vary greatly depending upon the character of the emulated program.

Interpretive emulation emulates each source instruction as a separate entity. Interpretive emulation provides an architecturally distinct state at each emulated source instruction boundary, and has the potential of being the most accurate and interactive of the three emulation techniques. Interpretive emulation typically has a predictable and potentially small memory requirement, since no translated copy of the program need be stored. However, interpretive emulation can be the slowest method, requiring many more host instructions to emulate a given source instruction as compared to either static or dynamic recompilation.

Interpretive emulation is the most desirable emulation technique in terms of emulation accuracy and robust performance; unfortunately, it is typically the slowest emulation technique. The most straightforward method of implementing an interpretive emulator is to employ a dispatch loop within the emulator to fetch a source instruction from the source program stream, and to use the binary value of the operation code within the source instruction to index a table in memory. The value of the table entry, referred to as a "pointer," is the address of an emulation routine consisting of host instructions that implement the architectural changes of state required to emulate the original source instruction. The dispatch loop issues a jump to the address indicated by the pointer, after which the emulation routine is executed. The final host instruction within the emulation routine returns control to the dispatch loop, which fetches the next source instruction from the source program.

The prior art interpretive emulator suffers from a first major performance problem in that no emulation actually occurs during the set of operations performed within the dispatch loop. The overall emulation of any given source instruction can be partitioned into two time intervals. The first time interval is that required to complete the operations performed within the dispatch loop, and the second time interval is that required to complete the host instructions comprising the emulation routine. Each operation performed within the dispatch loop increases the overall time required to emulate any given source instruction. The execution of two operations within the dispatch loop that rely upon results being returned from memory particularly increases the overall emulation time. If the data targeted by either of these operations does not reside within a cache, either of these operations can take longer to execute than an entire emulation routine.

The second major performance problem occurs as a result of the two branch instructions required for each source instruction's emulation. That is, one branch instruction is executed in the jump to the emulation routine, and another branch instruction is executed when the emulation routine returns to the dispatch loop. While branches are conceptually simple, they are difficult to efficiently implement on most microprocessors, particularly those having reduced instruction set computing (RISC) architectures. Each branch instruction significantly increases the overall time required for the emulation of any given source instruction.

What is needed is an apparatus and method for transferring control from a current emulation routine to a next emulation routine in which control is transferred from a current to a next emulation routine without the problems associated with the prior art.

SUMMARY OF THE INVENTION

The present invention is an apparatus and method for emulation routine control transfer, in which a jump host instruction (JHI) containing the address of a next emulation routine is created during the execution of a current emulation routine. The host jump instruction is placed upon a processor's instruction bus after execution of the final instruction within a current emulation routine. Thus, the execution of the next emulation routine begins immediately after the execution of the host jump instruction, and significant amounts of time associated with a dispatch loop are eliminated.

The apparatus of the present invention preferably comprises: an emulated program counter (EPC), a summing means, a state machine, a pointer storage means, an opcode storage means, and a jump instruction circuit. The EPC is coupled to the data, address, and control buses. The summing means is coupled to the address and data buses, and the state machine. The state machine is coupled to the summing means, the address and control buses, and the jump instruction circuit. The pointer storage means is preferably coupled between the data bus and the jump instruction circuit. The opcode storage means is coupled to the data, address and control buses. Finally, the jump instruction circuit is coupled to the state machine, the output of the pointer storage means, and the control, instruction, and instruction address buses. The state machine preferably issues commands on the control bus and directly to the summing means and the jump instruction circuit to prefetch the next emulation routine, create a jump instruction to the beginning of the next emulation routine and assert the jump instruction on the bus at the appropriate time to transfer directly from one emulation routine to the next using the single jump instruction.

The method of the present invention preferably comprises the steps of: determining whether a reference has been made to update an emulated program counter; if such reference has been made, performing the further steps of using the updated emulated program counter to prefetch a next source instruction to be emulated; using a subset of bits within the next source instruction to prefetch a pointer to the next emulation routine; creating a host jump instruction directed to the next emulation routine using the pointer; and placing the host jump instruction upon the instruction bus following the execution of the current emulation routine's final host instruction, resulting in a jump to the next emulation routine. The effect of the present invention is to incorporate the appropriate host jump instruction directed to the next emulation routine into the current emulation routine.

DETAILED DESCRIPTION OF THE PREFERRED EMBODIMENTS

Figure 1:
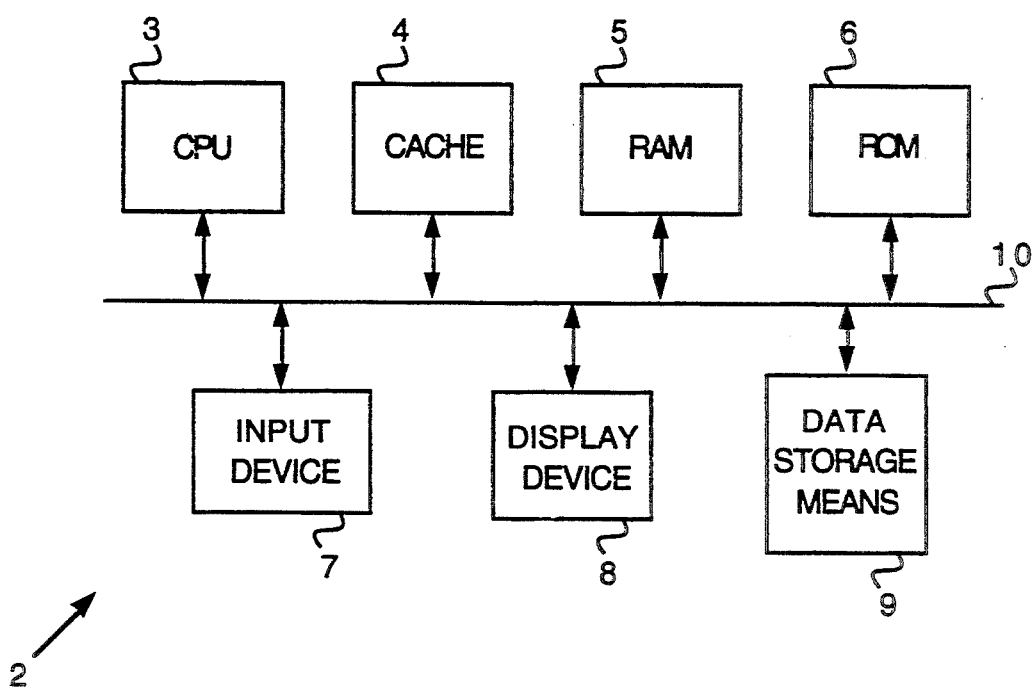
FIG. 1 is a block diagram of a computer system capable of functioning with the apparatus and method of the present invention.

Referring now to FIG. 1, a block diagram of a host computer system 2 capable of functioning with an apparatus 25 and method of the present invention is shown. The host computer system 2 preferably comprises a central processing unit (CPU) 3, a cache memory 4, given amounts of random access memory (RAM) 5 and read-only memory (ROM) 6, an input device 7 such as a keyboard, an output or display device 8, and a data storage means 9 such as a hard disk drive. All elements of the host computer system 2 are coupled to a common bus 10 in a Von Neumann architecture, where the common bus 10 further comprises an address bus 12, a data bus 14, a control bus 16, an instruction address bus 18, and an instruction bus 20. An exemplary host computer system comprises a Motorola 88100 CPU, a pair of Motorola 88200 16-kilobyte caches, 8 megabytes of RAM, a keyboard, a color display, and an 80 megabyte hard disk.

The host computer system 2 functions as an interpretive emulator, where each source instruction within a source instruction program is emulated by the execution of an appropriate set of host instructions within an emulation routine. Concurrent with the execution of a current emulation routine, the apparatus of the present invention creates a jump host instruction (JHI) to a next emulation routine. After the final host instruction within the current emulation routine has been executed and the CPU 3 issues a next instruction request, the apparatus of the present invention outputs the JHI. The CPU 3 executes the JHI to the next emulation routine, thereby initiating the execution of the next emulation routine. The apparatus 25 of the present invention preferably performs its operations concurrent with each emulation routine's execution. Moreover, no branch instruction is necessary to return to a dispatch loop as in the prior art. The apparatus 25 of the present invention therefore greatly improves the performance of the interpretive emulator since the branch instructions required by the prior art to return to the dispatch loop are a significant portion of first time interval.

Figure 2:
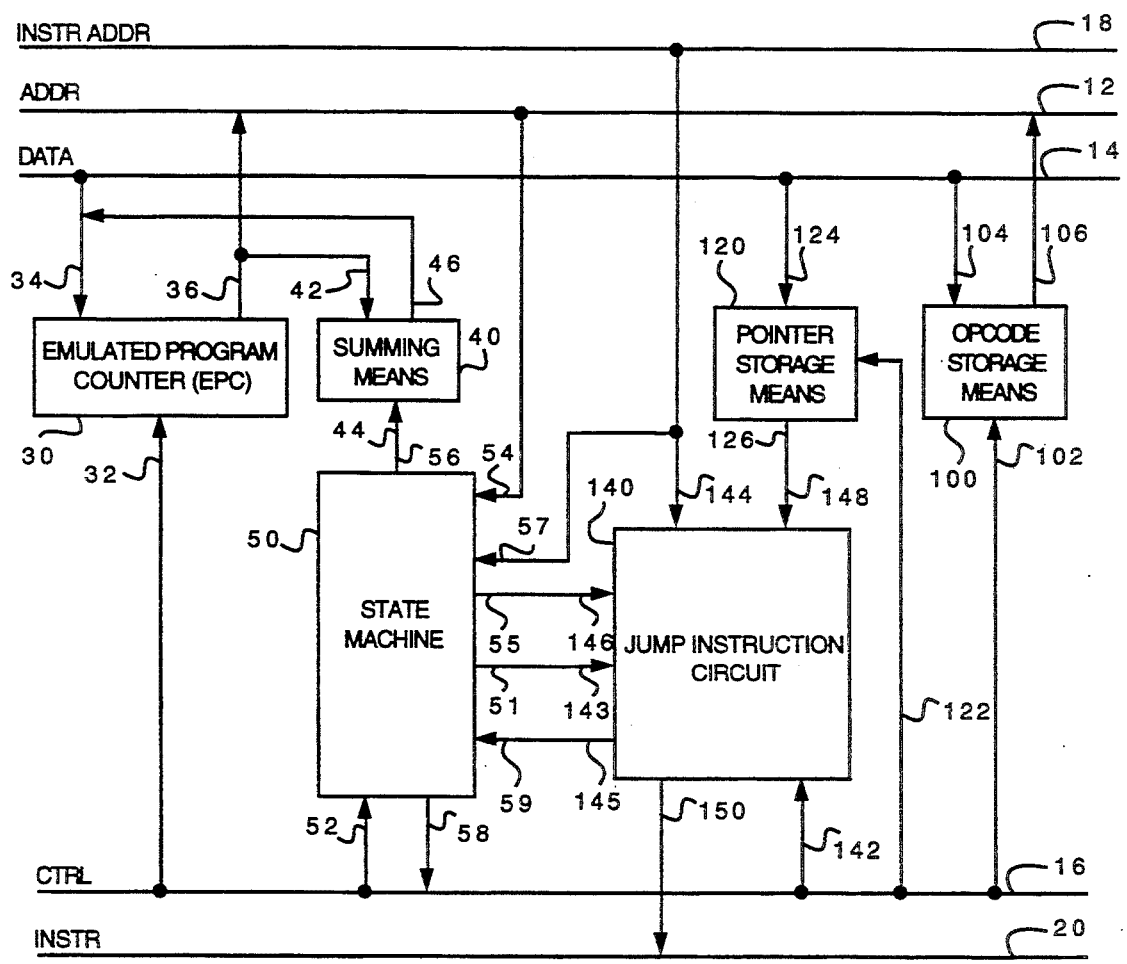
FIG. 2 is a block diagram of a first and preferred embodiment of an emulation routine control transfer apparatus constructed in accordance with the present invention.

Referring now to FIG. 2, a preferred embodiment of an emulation control transfer apparatus 25 constructed in accordance with the present invention is shown. The preferred embodiment of the apparatus 25 comprises an emulated program counter (EPC) 30, a summing means 40, a state machine 50, an opcode storage means 100, a pointer storage means 120, and a jump instruction circuit 140. The address bus 12, data bus 14, control bus 16, instruction address bus 18, and instruction bus 20 serve to provide couplings between the elements of the apparatus 25 and the host computer system 2 of FIG. 1. In the preferred embodiment of the apparatus 25, these buses 12, 14, 16, 18, 20 are each 32 bits wide.

The EPC 30 stores an emulated program counter value that indicates the address of the next source instruction. The state machine 50 updates the EPC 30 via the summing means 40. After the EPC 30 has been updated, the state machine 50 uses the contents of the EPC 30 to prefetch the next source instruction to be emulated. The opcode storage means 100 stores a plurality of bits of the next source instruction, where the plurality of bits form an opcode. Each source instruction has a unique opcode. On a computer system capable of executing source instructions directly (i.e., without emulation), each opcode corresponds to a microprogram that is executed to carry out the actions associated with the source instruction. The state machine 50 uses the contents of the opcode storage means 100 to prefetch a pointer to the next emulation routine, storing the pointer in the pointer storage means 120. After the pointer to the next emulation routine has been prefetched, the jump instruction circuit 140 uses the pointer to create the JHI to the next emulation routine. After the current emulation routine executes its final host instruction, the state machine 50 directs the jump instruction circuit 140 to output the JHI to the instruction bus 20. The next instruction received and executed by the CPU 12 is the JHI, thereby transferring control to the next emulation routine. Many computer architectures do not support a jump to an absolute address. Therefore, the preferred embodiment of the apparatus 25 creates the JHI such that upon execution, the jump is performed relative to the current value of the host program counter (PC).

The EPC 30 is preferably a data storage means having a control input 32, a load input 34, and an output 36. The control input 32 of the EPC 30 is coupled to the control bus 16, the load input 34 is coupled to the data bus 14, and the output 36 is coupled to the address bus 12. The EPC 30 can load a value in response to an appropriate control signal on the control bus 16. When such a control signal is received at the EPC's control input 32, the EPC 30 loads the value at it's load input 34 from the data bus 14. The CPU 3 loads the EPC 30 with an initial emulated program counter value in this manner during initialization of the apparatus 25. The emulation routine for a source instruction corresponding to a branch also causes the CPU 3 to directly load the EPC 30. The contents of the EPC 30 correspond to a program counter indicating the next source instruction to be emulated from a source instruction program. This value appears at the output 36 of the EPC 30. The program counter value contained within the EPC 30 indicates the address of the next source instruction to be emulated; thus, the EPC 30 contents are an emulated program counter value. In contrast, the program counter of the host computer system 2 indicates the address of the next host instruction that the host computer system 2 is to execute. In an exemplary embodiment, the EPC 30 is a register formed of D-flip flops.

The summing means 40 preferably comprises an adder having a first input 42, a second input 44, and an output 46. The first input 42 of the summing means 40 is coupled to the output 36 of the EPC 30, the second input 44 of the summing means 40 is coupled to the state machine 50, and the output 46 of the summing means 40 is coupled to the EPC's load input 34. The summing means 40 is used to determine the next source instruction to be emulated following a current source instruction by incrementing the emulated program counter value stored in the EPC 30. The summing means 40 increments the emulated program counter value according to the execution of a predetermined host instruction within the current source instruction's emulation routine. An emulated program counter value received at the summing means' first input 42 is added to an appropriate increment value generated by the state machine 50, to produce an updated emulated program counter value at the output 46 of the summing means 40. The output 46 of the summing means 40 is coupled to the input 34 of the EPC 30 to store the updated emulated program counter value in the EPC 30. Alternatively, the summing means 40 may include a register (not shown). The register preferably has its inputs coupled to the data bus 14 and its output coupled to the second input 44 of the summing means 40. A reserved address reference can cause a corresponding increment value to be stored in the register. The increment value stored in the register is sent to summing means 40 such that the summing means 40 produces the sum of the value currently in the EPC 30 plus the value currently in the register.

The opcode storage means 100 preferably comprises a data storage means having a control input 102, an opcode input 104, and an address output 106. The control input 102 is coupled to the control bus 16, while the opcode input 104 and the address output 106 are coupled to the data bus 14 and address bus 12, respectively. Upon receipt of a load opcode command at its control input 102, the opcode storage means 100 loads a plurality of bits representing an opcode from a signal present at its opcode input 104 via the data bus 14. The state machine 50 issues the load opcode command during the prefetch of the pointer to the next emulation routine. In the prefetch, the signal present at the opcode input 104 is the next source instruction to be emulated. The opcode storage means 100 loads the next source instruction's opcode. Each source instruction has a unique opcode, and the set of all source instruction opcodes is a set of consecutive integers. Therefore, each opcode is used as an offset to a base memory address to indicate a unique memory address within a consecutive memory address range. This in turn uniquely associates each source instruction with a memory address within the consecutive memory address range. Each memory address within the consecutive memory address range stores a pointer to the emulation routine for the source instruction associated with the memory address. Within the opcode storage means 100, a plurality of bits are reserved for indicating the base memory address. The CPU 3 issues a load base memory address command to the opcode storage means 100 prior to starting the source instruction program's emulation. When the state machine 50 issues the load opcode command, the opcode bits present upon the data bus are loaded into the opcode storage means 100 such that the opcode bits are concatenated with the base memory address bits, thereby generating the memory address of the pointer to the next emulation routine. This memory address is used by the state machine 50 to complete the prefetch operation.

Those skilled in the art will recognize that in an alternate embodiment of the apparatus 25, the opcode storage means 100 can be implemented as a buffer capable of storing a plurality of source instruction opcodes received from a burst memory read operation performed by the state machine 50.

The pointer storage means 120 is preferably a data storage means having a control input 122, a data input 124, and a data output 126. The control input 122 is coupled to the control bus 16, and the data input 124 is coupled to the data bus 14. The pointer storage means 120 receives commands via its control input 122. The state machine 50 issues a load pointer storage command to the pointer storage means 120 when the next emulation routine pointer is available on the data bus 14. In prior art interpretive emulators the operations of fetching the next source instruction and fetching the pointer to the next emulation routine would not begin until after the current emulation routine has completed its execution. These fetch operations can take as long as the execution of an entire emulation routine. The apparatus 25 of the present invention advantageously performs these fetch operations concurrent with the execution of the current emulation routine. This results in significantly accelerated interpretive emulation.

The jump instruction circuit 140 preferably comprises a means for monitoring addresses and means for creating the JHI, and has a control input 142, an instruction ready input 143, and address input 144, a final address output 145, an offset input 146, a pointer input 148, and an instruction output 150. The control input 142 is coupled to the control bus 16, the address input is coupled to the instruction address bus 18, the pointer input 148 is coupled to the output 126 of the pointer storage means 120, and the instruction output 150 is coupled to the instruction bus 20.

During the current emulation routine's execution, the jump instruction circuit 140 stores each host instruction address present on the instruction address bus 18 until a disable command is received from the state machine 50. The disable command indicates that a reserved address reference has been made, and that the address of the host instruction which made the reserved address reference is stored in the jump instruction circuit 140. Once the EPC 30 update reference has been detected, the jump instruction circuit 140 receives an instruction offset signal at its offset input 146. The jump instruction circuit 140 then forms the sum of the address of the host instruction referencing the EPC 30 update and the instruction offset signal. This sum is the address of the final host instruction within the current emulation routine. The jump instruction circuit 140 outputs the final host instruction address at its final address output 145.

After the pointer to the next emulation routine is loaded into the pointer storage means 120, the jump instruction circuit 120 forms the JHI to the next emulation routine by subtracting the final host instruction address from the pointer to the next emulation routine. The difference indicates the amount that the host must jump to be at the first instruction of the next emulation routine. The jump instruction circuit 140 directs either a wait signal or the JHI to the instruction output 150. If the JHI has been created during the execution of the current emulation routine, the JHI is directed to the instruction output 150. Otherwise, the wait signal is directed to the instruction output 150 until the JHI can be created. The jump instruction circuit 140 receives an output enable command from the state machine 50, resulting in the assertion of either the wait signal or the JHI to the instruction bus 20. Receipt of an output disable command from the state machine 50 prevents the jump instruction circuit 140 from transferring its output to the instruction bus 20.

In the apparatus 25 of the present invention, the current emulation routine executes the final host instruction, after which the CPU 3 issues a next instruction request. The JHI is output to the instruction bus 20 once the CPU 3 has issued this request. If the current emulation routine completes its execution prior to the creation of the JHI, the CPU 3 is likely to issue this next instruction request before the JHI is valid. In this case, the CPU 3 access to the instruction bus 20 must be stalled until the JHI is valid. The jump instruction circuit 140 receives from the state machine 50 a JHI available signal having a Boolean (true/false or high/low) value. Once the next instruction request has been issued by the CPU 3 after execution of the current emulation routine's host instruction, the wait signal is routed to the jump instruction circuit's instruction output 150 if the JHI available signal is low. The wait signal is maintained at the instruction output 150 until the JHI available signal becomes high, at which point the JHI is routed to the instruction output 150.

After the JHI has been placed upon the instruction bus 20, the jump instruction circuit 140 receives an enable command from the state machine 50. Receipt of the enable command causes the jump instruction circuit 140 to once again store each address present upon the instruction address bus 18.

The state machine 50 is preferably a state machine capable of issuing apparatus 25 control and DMA commands, and has a JHI ready output 51; a control input 52; a code input 54; an offset output 55; an increment signal output 56; a control output 58; a first comparison input 57; and a second comparison input 59. The control input 52 and the control output 58 are coupled to the control bus 16, the code input 54 is coupled to the address bus 12, and the first comparison input 57 is coupled to the instruction address bus 20. The increment signal output 56 is coupled to the second input 44 of the summing means 40. The offset output 55 is coupled to the offset input 146 of the jump instruction circuit 140, and the second comparison input 59 and the JHI ready output 51 are coupled to the jump instruction circuit's final address output 145 and instruction ready input 143, respectively. The state machine 50 receives control information via its control input 52, and performs DMA operations and issues commands to the EPC 30, the opcode storage means 100, the pointer storage means 120, and the jump instruction circuit 140 via the control output 58.

Within the source instruction set, each source instruction to be emulated can vary in length. The emulated program counter value indicates the address of the next source instruction to be emulated, and thus, the EPC 30 can be accurately incremented only from within the current source instruction emulation routine. In the preferred embodiment of the apparatus 25, a set of memory addresses is reserved, where each reserved address corresponds to a value by which the EPC 30 may be incremented. The value corresponding to each reserved address is predefined when the emulation routines are written and is implicit from the reserved address. Moreover, at some point in each emulation routine, a reference to a reserved address must be made to indicate the location of the next instruction to emulate.

The state machine 50 issues a command to place the JHI instruction on the instruction bus 20 at the appropriate time, namely, after the current emulation routine has executed its final host instruction and the CPU 3 has issued a next instruction fetch operation. Therefore, the state machine 50 must monitor the current emulation routine's execution and determine when the emulation routine has arrived at its final host instruction. For a given emulation routine, the location of the final host instruction is known only within the emulation routine. Therefore, the set of reserved addresses is also used to indicate the location of the final host instruction within the emulation routine.

During the execution of every source instruction emulation routine, a host instruction causes a reserved address to be placed upon the address bus 12. The reserved address indicates the amount that the EPC 30 is to be incremented and the location of the final host instruction within the emulation routine. The state machine 50 monitors the address bus 12 via its code input 54, and detects whether the address present upon the address bus 12 is one of the reserved addresses. While the state machine 50 is monitoring the address bus 12 for the presence of a reserved address, it is in its initial state. If a reserved address is detected, the state machine 50 decodes the reserved address. As a result of the decoding, the state machine 50 generates an increment signal corresponding to the value by which the EPC 30 is to be incremented, and an instruction offset signal corresponding to the location of the final host instruction within the emulation routine. In the decoding, a first subset of bits within the reserved address is decoded to generate the increment signal, and a second subset of bits within the reserved address is decoded to generate the increment offset signal. In an exemplary reserved address definition, reserved addresses are recognizable as having high-order bits with a fixed value such as zero. For example, in a 32-bit address, if the eight high-order bits are zero, the address is a reserved address. For the 32-bit reserved address, the first subset of bits is taken from the eight address bits immediately adjacent the eight high-order bits, and the second subset is taken from the 16 low-order bits of the address. In this case, the 32-bit address 0002000F (Hexadecimal) indicates that the EPC 30 must be incremented by two, and that the final host instruction within the emulation routine is located 15 (Hexadecimal F) host instruction addresses away from the instruction that made the reserved address reference within the emulation routine. In the decoding, an emulation routine referring to address 0002000F causes address 0002000F to appear upon the address bus 12. The state machine 50 detects that address 0002000F is a reserved address, and decodes it to generate an increment signal having the value two and an instruction offset signal having the value fifteen. The state machine 50 outputs the increment signal at its increment signal output 56, such that the summing means 40 produces the sum of the value currently in the EPC 30 plus the value provided by the state machine 50. The instruction offset signal is output at the offset output 55. In an alternate embodiment, a reserved address reference can cause a corresponding increment value to be stored in a register (not shown) having an input coupled to the data bus 14. The register also has an output coupled to the second input of the summing means 40, such that the summing means 40 produces the sum of the value currently in the EPC 30 plus the value currently in the register.

After a reserved address reference has been received, the state machine 50 outputs the increment signal to the summing means 40 and the instruction offset signal to the jump instruction circuit 104. Next, the state machine 50 issues a disable command to the jump instruction circuit 140 to prevent the jump instruction circuit 140 from storing instruction addresses following the instruction that issued the reserved address reference. Since the increment signal was output to the summing means 40, the updated emulated program counter value is present at the summing means output 46. Therefore, the state machine 50 next issues an EPC 30 load command to store the updated emulated program counter value. At this point, the EPC 30 outputs the address of the next source instruction to be emulated. The state machine 50 next issues a first DMA command to prefetch the next source instruction, where the contents of the EPC 30 are used as the memory read address. As a result of the first DMA read operation, the next source instruction is placed upon the data bus 14. The state machine 50 then issues a load opcode command to the opcode storage means 100 via its control output 58, causing the opcode storage means 100 to store a plurality of bits of the next source instruction that are the opcode.

Following issuance of the load opcode command, the state machine 50 issues a second DMA read command via the control output 58. In the second DMA read command, the opcode stored within the opcode storage means 100 is used to index a table in memory, where the table contains pointers to emulation routines. Upon completion of the second DMA read command, the pointer corresponding to the emulation routine indicated by the next source instruction's opcode is placed upon the data bus 14. The state machine 50 next issues a load pointer command to the pointer storage means 120 via the control output 58, causing the pointer storage means 120 to load the pointer value present on the data bus 14. The jump instruction circuit 140 creates the JHI by subtracting the final host instruction address from the pointer to the next emulation routine. Thus, after the state machine 50 has issued the load pointer command, the JHI to the next emulation becomes valid. The state machine 50 outputs the JHI available signal at its JHI ready output 51. The jump instruction circuit 140 uses this signal to determine whether to route a wait signal or the JHI to the instruction bus 20. In the event that the CPU 3 issues the next instruction request after execution of the final host instruction in the current emulation routine, but before the load pointer command has been issued, the wait signal prevents the CPU 3 from using an invalid JHI. Prior to the load pointer command, the state machine 50 maintains the JHI available signal at a low value, indicating to the jump instruction circuit 140 that the wait signal is to be routed to the instruction bus 20. After the load pointer command has been issued, the state machine 50 sets the JHI available signal to a high value, indicating to the jump instruction circuit 140 that the JHI is to be routed to the instruction bus 20. The JHI available signal is output at the JHI ready output 51.

The state machine 50 also monitors the instruction address bus 18 via its first comparison input 57. The final host instruction address is received from the jump instruction circuit 140 at the state machine's second comparison input 59. Once the address signal present at the first comparison input 57 is greater than the final host instruction address present at the second comparison input 59, the CPU 3 has issued the next instruction request after the final host instruction's execution. The state machine 50 therefore issues an output enable command to the jump instruction circuit 140, causing the jump instruction circuit 140 to transfer either the wait signal or the valid JHI to the instruction bus 20 based upon the value of the JHI available signal.

Once the JHI has been output to the instruction bus 20, the state machine 50 resets the JHI available signal to a low value, and issues an enable command to the jump instruction circuit 140 that causes the jump instruction circuit 140 to store each address present upon the instruction address bus 18. Once another reference to a reserved address is detected, the state machine 50 begins its sequence of operations beginning with issuance of the disable command.

Figure 3:
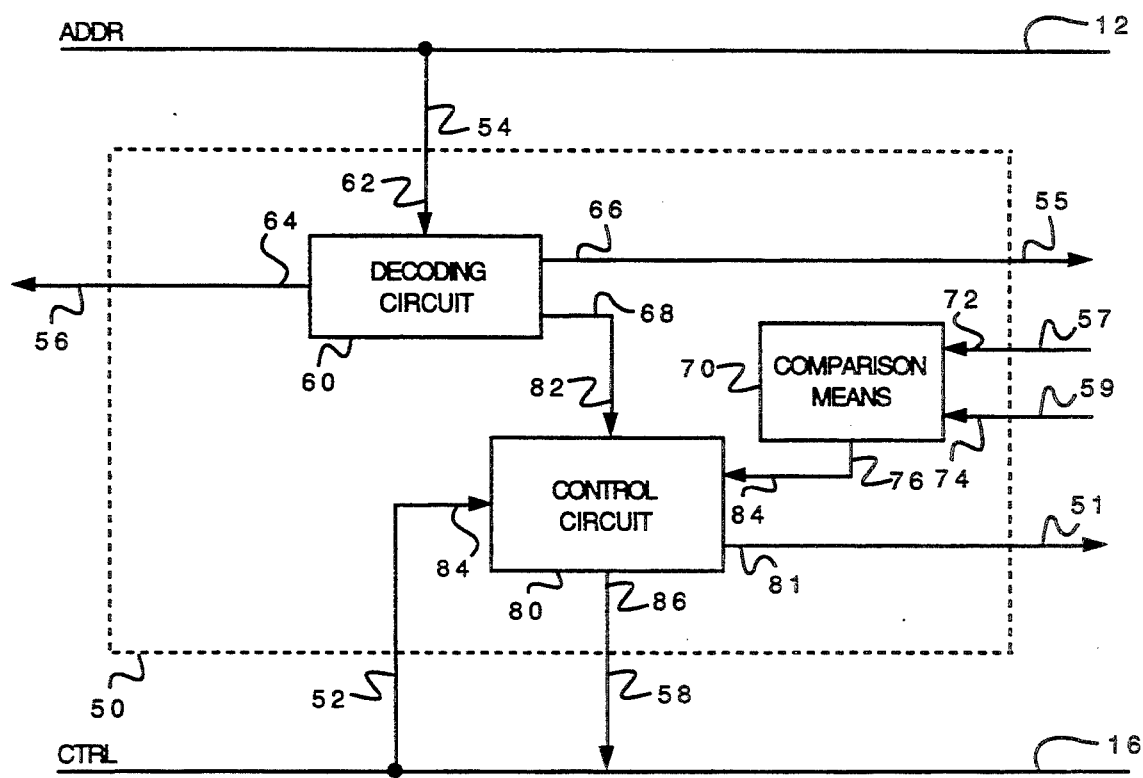
FIG. 3 is a block diagram of a preferred embodiment of a state machine of the present invention.

Referring now to FIG. 3, a block diagram of the preferred embodiment of the state machine 50 of the apparatus 25 is shown. The state machine 50 preferably comprises a decoding circuit 60, a comparison means 70, and a control circuit 80. The decoding circuit 60 comprises a decoder having an input 62, a first decoded output 64, a second decoded output 66, and an acknowledgment output 68. The input 62 of the decoding circuit 60 forms the state machine's code input 54, and is coupled to the address bus 12. Since the input 62 is coupled to the address bus 12, the decoding circuit 60 receives all addresses asserted on the address bus 12. The first decoded output 64 provides the state machine's increment signal output 56. If an address received corresponds to one of the reserved addresses, the decoding circuit 60 produces an appropriate increment value at the first decoded output 64. This value is used by the summing means 40 to update the EPC 30 by an amount corresponding to the particular reserved address received. In response to receipt of one of the reserved addresses, the decoding circuit 60 also produces an instruction offset signal at its second decoded output 66. The second decoded output 66 forms the offset output 55 of the state machine 50. The instruction offset signal is used by the jump instruction circuit 140 to generate the address of the final host instruction within the emulation routine making the reserved address reference. The decoding circuit 60 also produces an acknowledgment signal at its acknowledgment output 68 in response to receipt of a reserved address. The acknowledgment signal is used by the control circuit 80 to initiate a sequence of state control commands. In the preferred embodiment, the decoding circuit 60 comprises a 32-bit decoder, receiving 32-bit addresses from the address bus 12 and outputting a 4-bit increment value and an 8-bit instruction offset signal.

The comparison means 70 comprises a comparator having a first input 72, a second input 74, and an output 76. The first input forms the state machine's first comparison input 57, and receives addresses asserted upon the instruction address bus 18. The second input 74 of the comparison means 70 forms the second comparison input 59 of the state machine 50, and receives the final host instruction address from the jump instruction circuit 140. When the instruction address present at the comparison means' first input 72 is greater than the final host instruction address, the comparison means 70 generates an execution completion signal at its output 76. The execution completion signal indicates that the final host instruction in the current emulation routine has been executed, and the CPU 3 has issued the next instruction request.

The control circuit 80 preferably comprises control logic for issuing the sequence of state control commands in response to the acknowledgment signal, and includes an output 81, a first state control input 82, a second state control input 84, and a command output 86. The first state control input 82 is coupled to the acknowledgment output 68 of the decoding circuit 60, the second state control input 84 is coupled to the output 76 of the comparison means 70, and the command output 86 is the control output 58 of the state machine 50 and is coupled to the control bus 16. The output 81 is the JHI ready output 51 of the state machine 50, and is therefore coupled to the jump instruction circuit's instruction ready input 143. The control circuit 80 receives the acknowledgment signal at the first state control input 82. Prior to receiving the acknowledgment signal, the control circuit 80 is in an initial state. Receipt of the acknowledgment signal indicates that a reference to one of the reserved addresses has been made, and causes the control circuit 80 to issue a sequence of state control signals and commands. This sequence of signals and commands includes: the disable command and the load final address commands issued to the jump instruction circuit 140, the EPC 30 load command, the first DMA read command, the opcode storage means load command, the second DMA read command, the pointer storage means load command, the JHI available signal, the output enable command, and the enable command. Each command is issued via the command output 86. The control circuit 80 returns to its initial state after the enable command has been issued to the jump instruction circuit 140. In the preferred embodiment, the control circuit 80 is referenced to a system clock, thereby ensuring each command is issued at an appropriate time.

Figure 4:
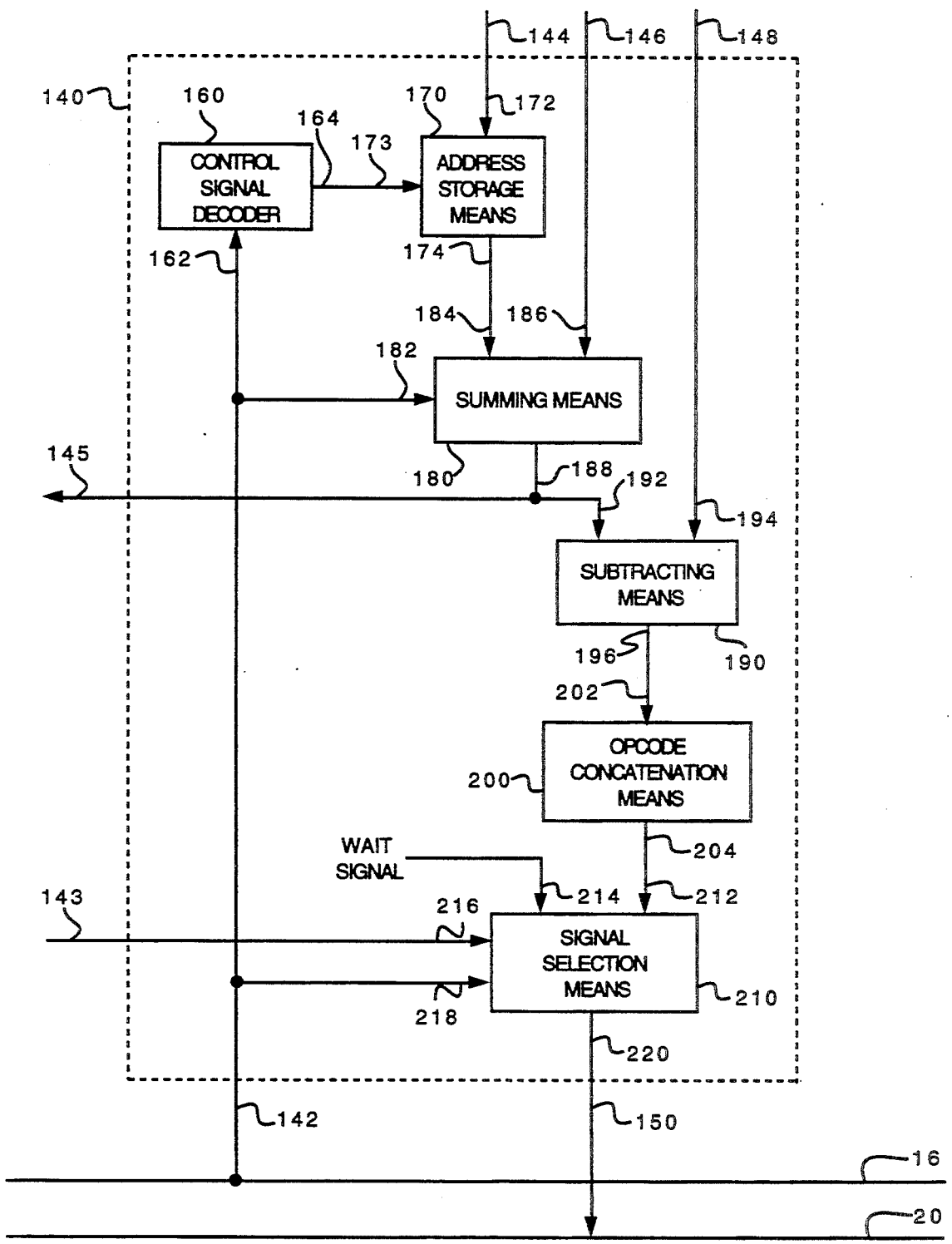
FIG. 4 is a block diagram of a preferred embodiment of a jump instruction circuit of the present invention.

Referring now to FIG. 4, a block diagram of a preferred embodiment of the jump instruction circuit 140 is shown. The jump instruction circuit 140 comprises a control signal decoder 160, an address storage means 170, a summing means 180, a subtracting means 190, an opcode concatenation means 200, and an signal selection means 210. The control signal decoder 160 comprises a decoder having an input 162 and an output 164. The input 162 of the control signal decoder 160 is coupled to the control input 142 of the jump instruction circuit 140 and therefore to the control bus 16. The control signal decoder 160 controls the loading of instruction addresses into the address storage means 170. The control signal decoder 160 monitors and decodes the signals present on the control bus 16. If the signal on the control bus 16 is an instruction request issued by the CPU 3, the control signal decoder 160 outputs a load address command. Upon receipt of the load disable signal at its control input 162, the control signal decoder 160 is prevented from issuing subsequent load address commands until the load enable command is received from the state machine 50.

The address storage means 170 comprises a register having an input 172, a control input 173, and an output 174. The input 172 of the address storage means 170 is coupled to the address bus 12 and forms the address input 144 of the jump instruction circuit 140, while the address storage means' control input 173 is coupled to the output 164 of the control signal decoder 160. Upon receiving the load address command at its control input 173, the address storage means 170 loads the address present at its inputs 172. The load address command is received for each host instruction address during the execution of the current emulation routine until the control signal decoder 160 is prevented from issuing the load address command due to its receipt of the load disable command. Since the state machine 50 issues the load disable command in response to a reserved address asserted upon the address bus 12, the contents of the address storage means 170 at the time the load disable command is issued are the address of the host instruction that made the reserved address reference.

The summing means 180 preferably comprises an adder and a register having a control input 182, a first input 184, a second input 186, and an output 188. The control input 182 of the summing means 180 is coupled to the jump instruction circuit's control input 142 and therefore to the control bus 16. The first input 184 of the summing means 180 is coupled to the output 174 of the address storage means 170, and the output 188 of the summing means 180 forms the final address output 145 of the jump instruction circuit 140. After the state machine 50 has issued the load disable command, the summing means' first input 184 receives the address of the host instruction making the reserved address reference. The second input 186 of the address summing means 180 is coupled to the jump instruction circuit's offset input 146, and receives the instruction offset signal from the state machine 50. The summing means 180 adds the address of the host instruction corresponding to the reserved address reference to the instruction offset signal, thereby generating the address of the final host instruction in the current emulation routine. Upon receipt of the load final address command from the state machine 50, the summing means 180 loads the final host instruction address into its register. This address is output as a final address signal at the jump instruction circuit's final address output 145.

The subtracting means 190 preferably has a first input 192, a second input 194, and an output 196. In an exemplary embodiment, the subtracting means 190 is a two's complement adder. The first input of the subtracting means 190 is coupled to the output 188 of the summing means 180, and the second input 194 of the subtracting means 190 forms the pointer input 148 of the jump instruction circuit 140. When the pointer to the next emulation routine is available in the pointer storage means 120, the subtracting means 190 receives the pointer at its second input 194. After the load final address command has been issued by the state machine 50, the first input 192 of the subtracting means 190 receives the address of the final host instruction in the current emulation routine. The subtracting means 190 creates a relative jump signal at its output 196 that indicates the address of the next emulation routine relative to the value of the host PC upon the CPU's issuance of the next instruction request after the final host instruction in the current emulation routine has been executed. When the CPU 3 has issued this next instruction request, the host PC indicates the address immediately following the address of the final host instruction in the current emulation routine. Thus, in producing the relative address signal, the subtraction means 190 subtracts the final host instruction address and one host instruction address increment from the pointer to the next emulation routine.

The opcode concatenation means 200 preferably comprises combinational logic having an input 202 and an output 204. The input of the opcode concatenation means 200 is coupled to the output 196 of the subtraction means 190. The opcode concatenation means 200 receives the relative address signal from the subtracting means 190, and concatenates a jump host opcode portion onto the relative address signal to produce the JHI at its output 204.

The signal selection means 210 preferably comprises a multiplexor having an output 220 that can be selectively enabled or disabled and having a first input 212, a second input 214, a selection input 216, and an enable input 218. The first input 212 of the signal selection means 210 is coupled to the output 204 of the opcode concatenation means 200, and therefore receives the JHI. The second input 214 of the signal selection means 210 receives the wait signal. The selection input 216 forms the instruction ready input 143 of the jump instruction circuit 140, and the enable input 218 is coupled to the jump instruction circuit's control input 142 and therefore to the control bus 16. The selection input 216 receives the JHI available signal. If the JHI available signal is low, indicating that the JHI is not valid, the wait signal is routed to the outputs 220 of the signal selection means 210. If the JHI available signal is high, indicating a valid JHI, the JHI received at the first input 212 is routed to the signal selection means output 220. The signal selection means 210 receives the output enable command from the state machine 50 at its enable input 218. Prior to receipt of the output enable command, the output 220 of the signal selection means 210 is disabled. Once the output enable command is received, the signal selection means output 220 is enabled, resulting in the routing of either the wait signal or the JHI signal to the instruction bus 20 depending upon the value of the JHI available signal. Receipt of the output disable command from the state machine 50 disables the signal selection means output 220. The output 220 of the signal selection means 210 remains in the disabled state until an enable command is received and vice versa.

Figure 5:
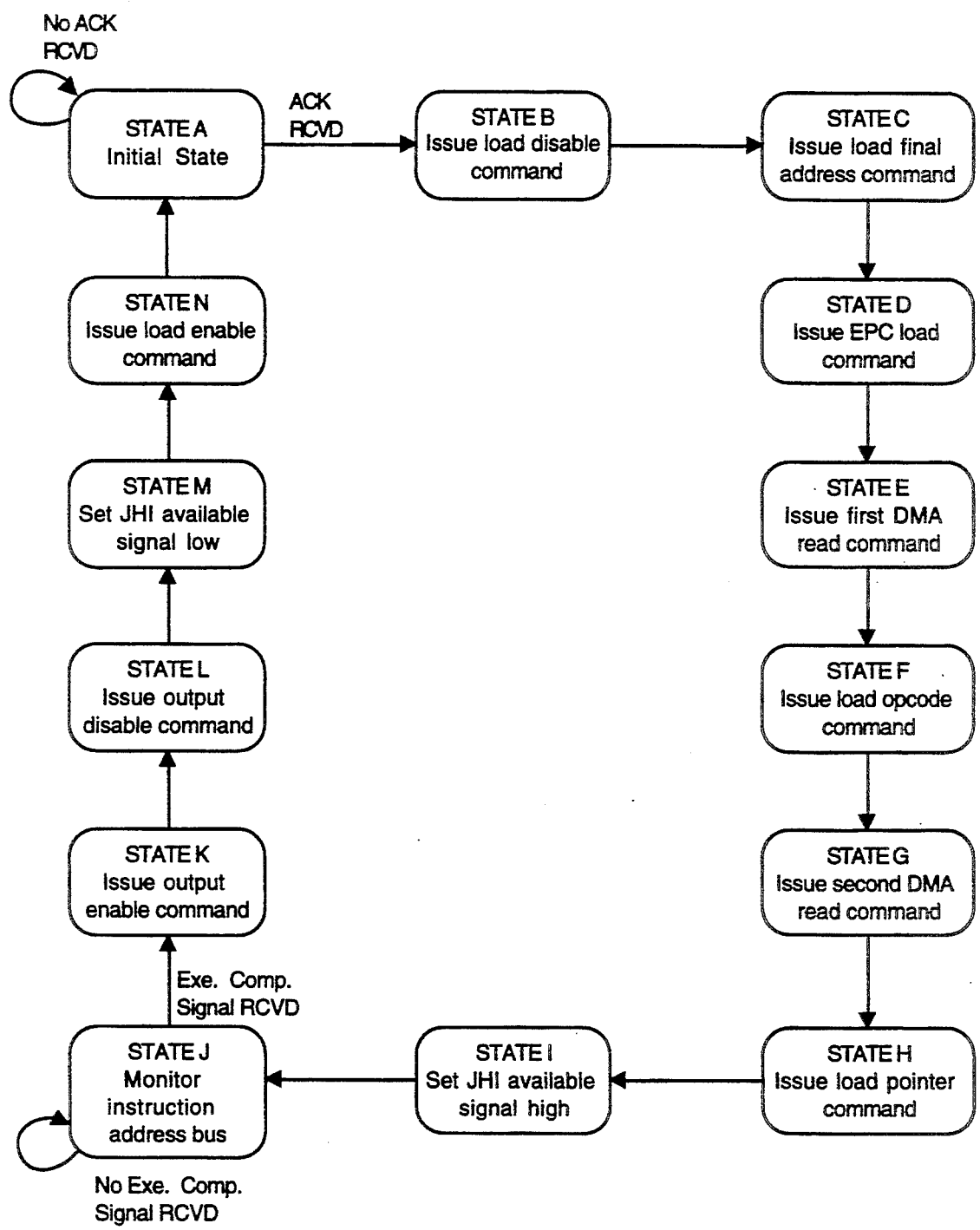
FIG. 5 is a state diagram for the preferred embodiment of the control circuit of the present invention.

Referring now to FIG. 5, a state diagram for the operation of the control circuit 80 of the preferred embodiment is shown. Control circuit 80 operation begins in an initial state A, with the control circuit 80 waiting for receipt of the acknowledgment signal. In the initial state, the JHI available signal is low. If the acknowledgment signal is not received, the control circuit 80 remains in its initial state. Upon receipt of the acknowledgment signal, the control circuit 80 proceeds to state B and issues the load disable command to the jump instruction circuit 140. The load disable command prevents the jump instruction circuit 140 from storing additional instruction addresses once the address of the host instruction referring to the reserved address has been stored. The state machine 50 also outputs the instruction offset signal after the reserved address has been detected, and the jump instruction circuit 140 generates the address of the final host instruction from the sum of the host instruction address associated with the reserved address reference and the instruction offset signal. The control circuit 80 therefore next issues the load final address command to the jump instruction circuit 140 in state C. The control circuit 80 next proceeds to state D and issues the EPC 30 load command to store the updated emulated program counter value. Next, the control circuit 80 advances to state E and issues the first DMA read command. After the first DMA read command, the next source instruction is present upon the data bus 14. Following state E, the control circuit 80 issues the load opcode command to the opcode storage means 100 in state F, after which the control circuit 80 proceeds to state G and issues the second DMA read command. At this point, the pointer to the next emulation routine is available on the data bus 14. Therefore, the control circuit 80 advances to state H and issues the load pointer command to the pointer storage means 120. Once the load pointer command has been issued, the valid JHI is created within the jump instruction circuit 140. The control circuit 80 thus advances to state I an sets the JHI available signal high. The control circuit 80 then proceeds to state J, wherein it monitors the instruction address bus 18. Until the execution complete signal is received, the control circuit 80 remains in state J. If the execution completion signal is received while in state J, the final host instruction in the current emulation routine has been executed and the CPU 3 has issued the next instruction request. In this case, the control circuit 80 proceeds to state K and issues the output enable command to the jump instruction circuit 140, causing the JHI to be asserted upon the instruction bus 20. The CPU 3 receives the JHI and executes the jump to the next emulation routine. Following state K, the control circuit 80 advances to state L and issues the output disable command to the jump instruction circuit 140, thereby removing the JHI from the instruction bus 20 and allowing the instruction bus 20 to be used in subsequent instruction fetch operations. After state L, the control circuit 80 proceeds to state M and sets the JHI available signal low. Next, the control circuit 80 advances to state N and issues the load enable command to the jump instruction circuit 140, allowing the jump instruction circuit 140 to store instruction addresses upon the instruction address bus 18 upon initiation of the next emulation routine's execution. After state N, the control circuit 80 returns to its initial state A.

If the execution completion signal is received in any of the states A through H, the control circuit 80 proceeds to a state X (not shown) and issues the output enable command to the jump instruction circuit 140. Since the JHI available signal is low until the control circuit 80 reaches state I, the wait signal is output to the instruction bus 20 in response to the execution completion command. This effectively stalls the CPU 3 until the JHI available signal indicating a valid JHI is set high in state I. After state X, the control circuit 80 returns to the state in which the execution completion command was received.

Figure 6:
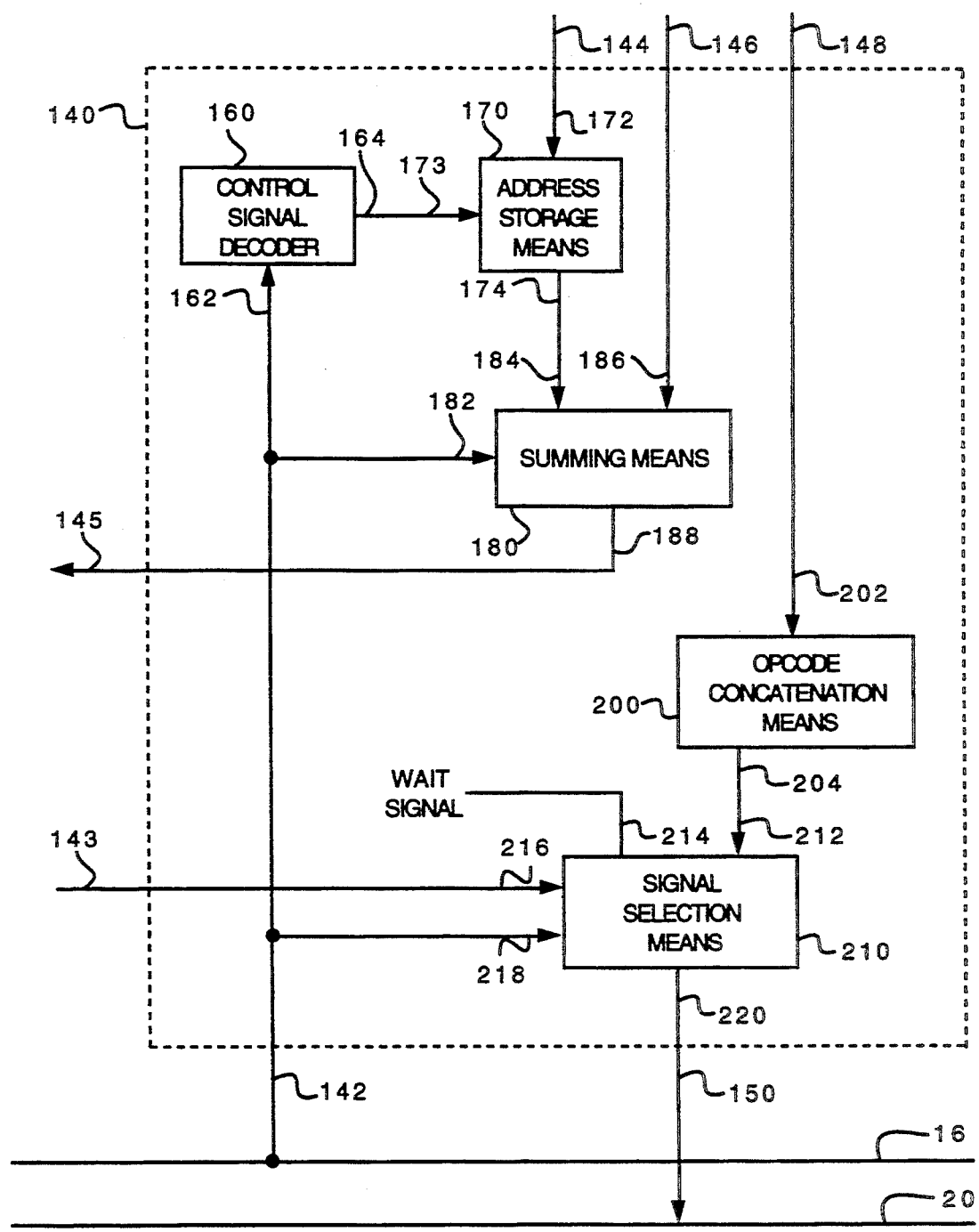
FIG. 6 is a block diagram of a second embodiment of the jump instruction circuit of the present invention.

Referring now to FIG. 6, a block diagram of a second embodiment of the jump instruction circuit 140 is shown. Like reference numbers have been used in FIG. 4 and FIG. 6 for like elements. In the second embodiment, the jump instruction circuit 140 creates a JHI for an absolute jump rather than for a host PC relative jump. In this case, the pointer to the next emulation routine can be incorporated into the JHI directly without use of the subtracting means 190 of the preferred embodiment. Therefore, in the second embodiment of the jump instruction circuit 140, the subtracting means 190 of the preferred embodiment is not present. Instead, the pointer to the next emulation routine is received at the input 202 of the opcode concatenation means 200, corresponding to an absolute address signal rather than being related to the relative address signal. In all other respects, the jump instruction circuit 140 of the second embodiment is identical with that of the preferred embodiment in terms of its components and functionality.

Figure 7A:
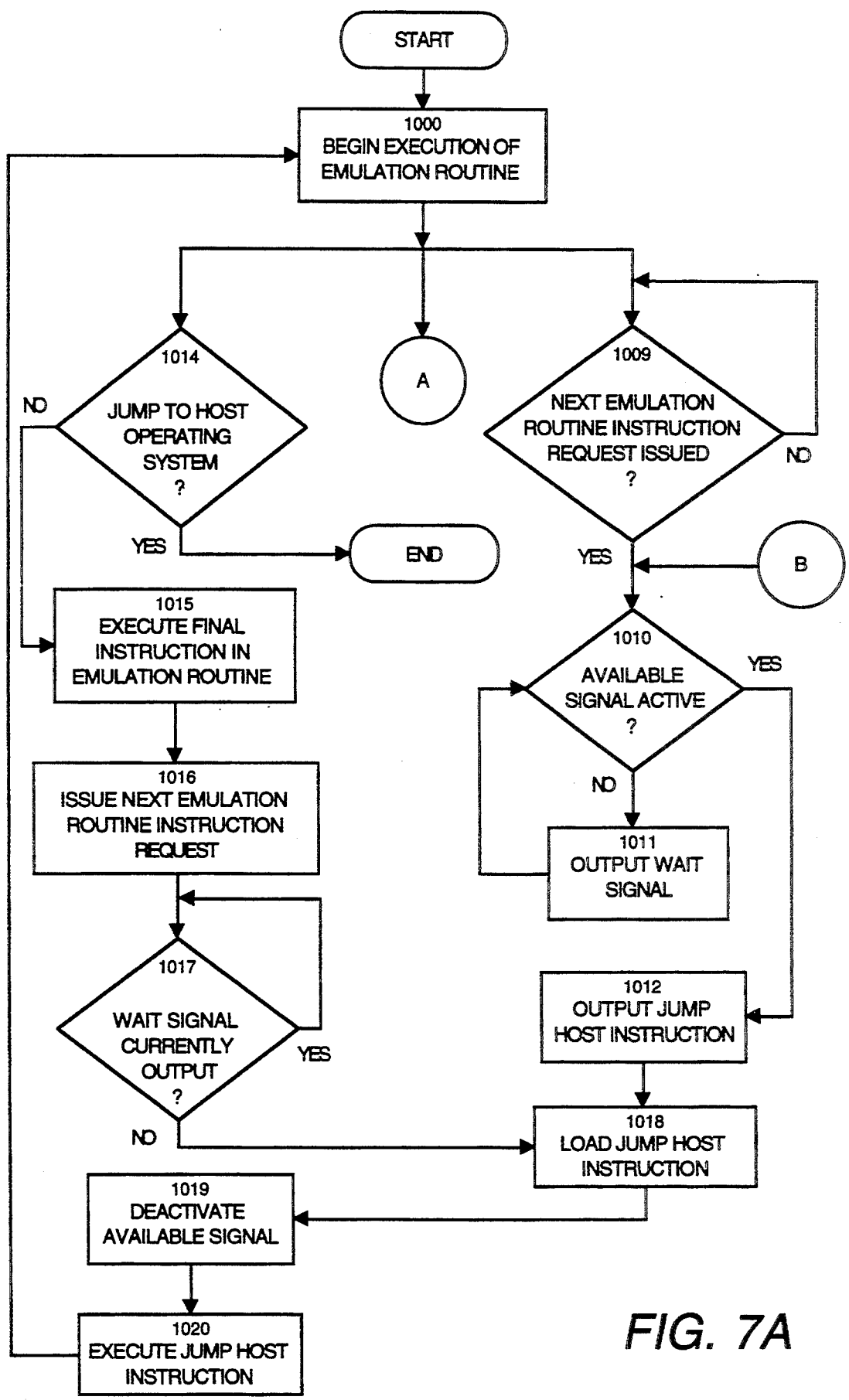
FIGS. 7A and 7B a flowchart illustrating a first method for emulation routine control transfer.
Figure 7B:
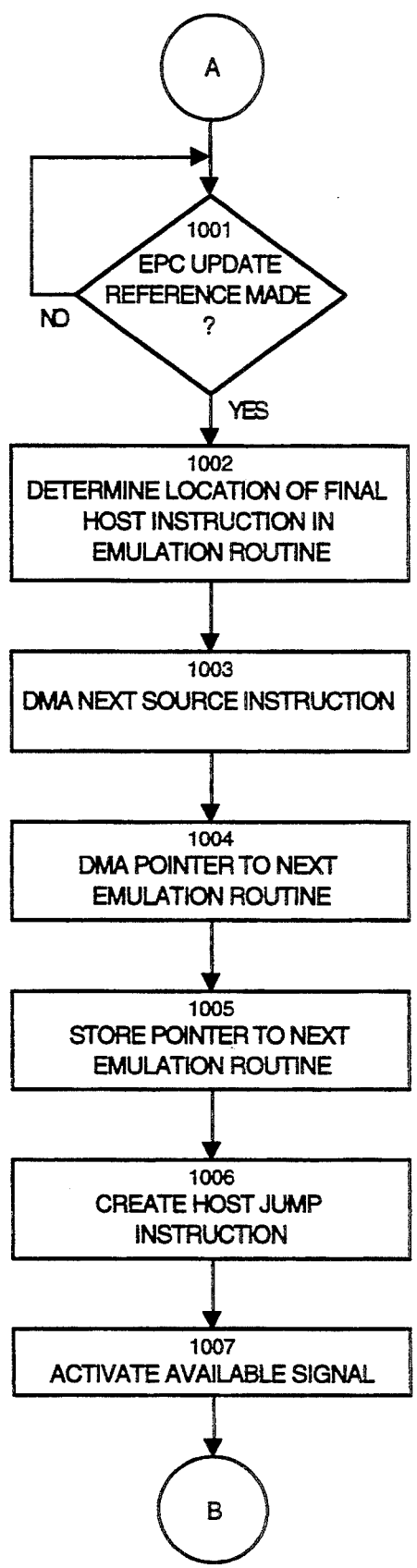

Referring now to FIGS. 7A and 7B, a flowchart of a first method for emulation routine control transfer is shown. The first method begins in step 1000 by beginning the execution of an emulation routine. The method next proceeds to steps 1001, 1009, and 1014 concurrently. In step 1001, the first method determines if an EPC update reference has been made in step 1001. If not, the first method remains at step 1001. If an EPC update reference has been made, the first method next determines the address or location of the final host instruction in the current emulation routine in step 1002. Following step 1002, the first method performs a DMA operation to retrieve the next source instruction to be emulated in step 1003. The first method then proceeds to step 1004 to perform a second DMA operation to retrieve the pointer to the next emulation routine, and then stores the pointer to the next emulation routine in step 1005. The first method then creates the JHI to the next emulation routine in step 1006 using the pointer to the next emulation routine and the location of the final host instruction in the currently executing emulation routine. Following step 1006, the first method activates an available signal in step 1007, indicating that the JHI is valid. The first method then proceeds to step 1010.

In step 1009, the first method determines if a next emulation routine instruction request has been issued by the CPU 3. If not, the first method remains at step 1009. Once the next emulation routine instruction request has been issued, the first method proceeds to step 1010 and determines if the available signal is active. If not, the first method proceeds to step 1011 and outputs the wait signal to the instruction bus 20, after which the first method returns to step 1010. If the available signal is active in step 1010, the first method proceeds to step 1012 and outputs the JHI to the instruction bus 20. Following step 1012, the first method proceeds to step 1018.

After the execution of the emulation routine was initiated in step 1000, the first method proceeds to steps 1001, 1009, and 1014 concurrently. In step 1014, the first method determines if a host instruction has been executed that results in a jump to the host operating system. If so, the emulation of the source instruction program is complete, and the first method ends. If the jump to the host operating system has not occurred, the first method proceeds to step 1015, and executes the final instruction in the emulation routine. Following step 1015, the first method issues the next emulation routine instruction request in step 1016. The first method then proceeds to step 1017, and determines if the wait signal is currently being output. The presence of the wait signal causes the first method to remain at step 1017. If the wait signal is not currently being output, the valid JHI is being output instead. The CPU 3 next loads the JHI in step 1018. Next, the preferred method deactivates the available signal in step 1019, after which it executes the JHI in step 1020. Following step 1020, operation returns to step 1000, thereby transferring control to the next emulation routine.

Figure 8A:
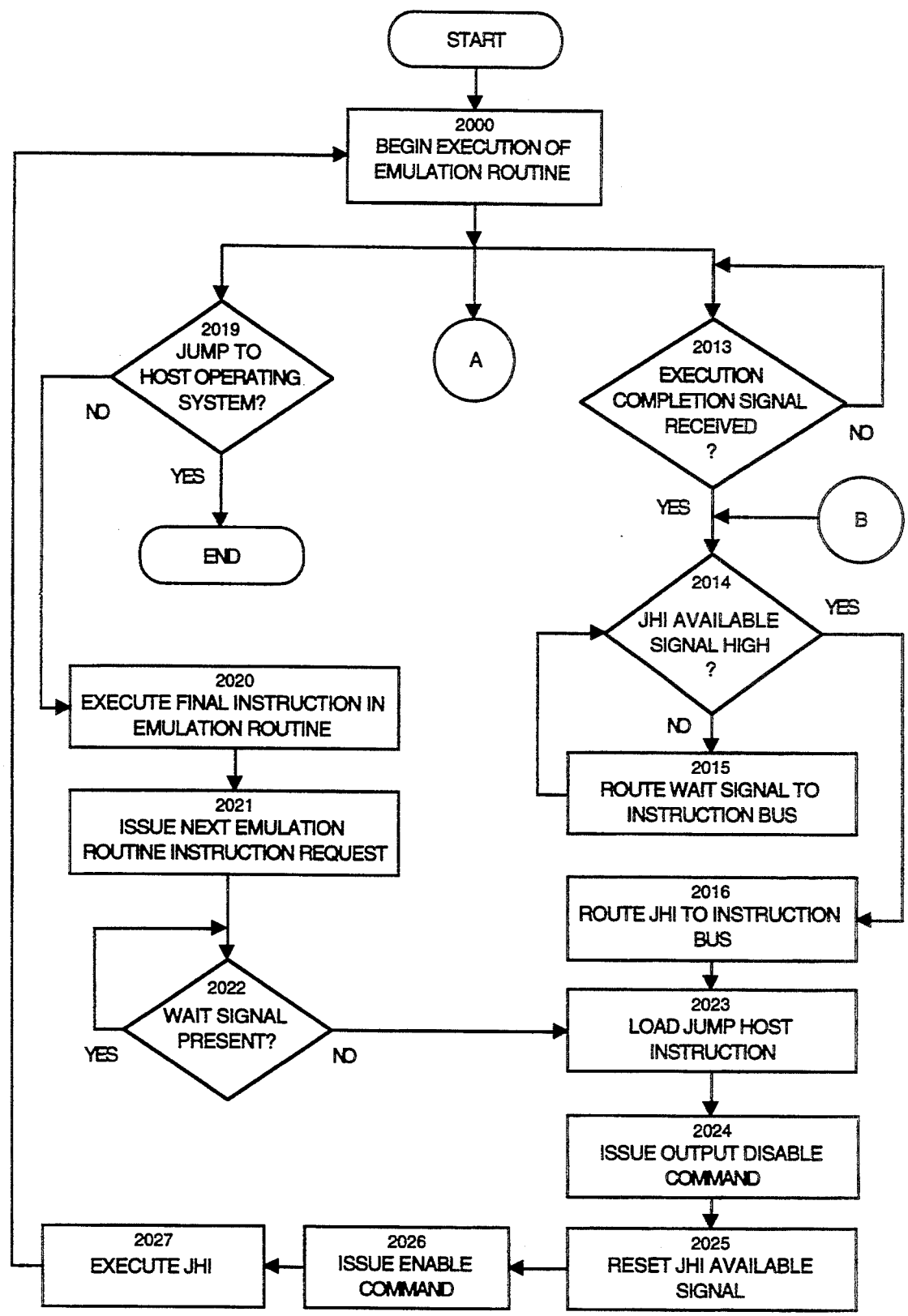
FIGS. 8A and 8B de a flowchart illustrating a second and preferred method for emulation routine control transfer.
Figure 8B:
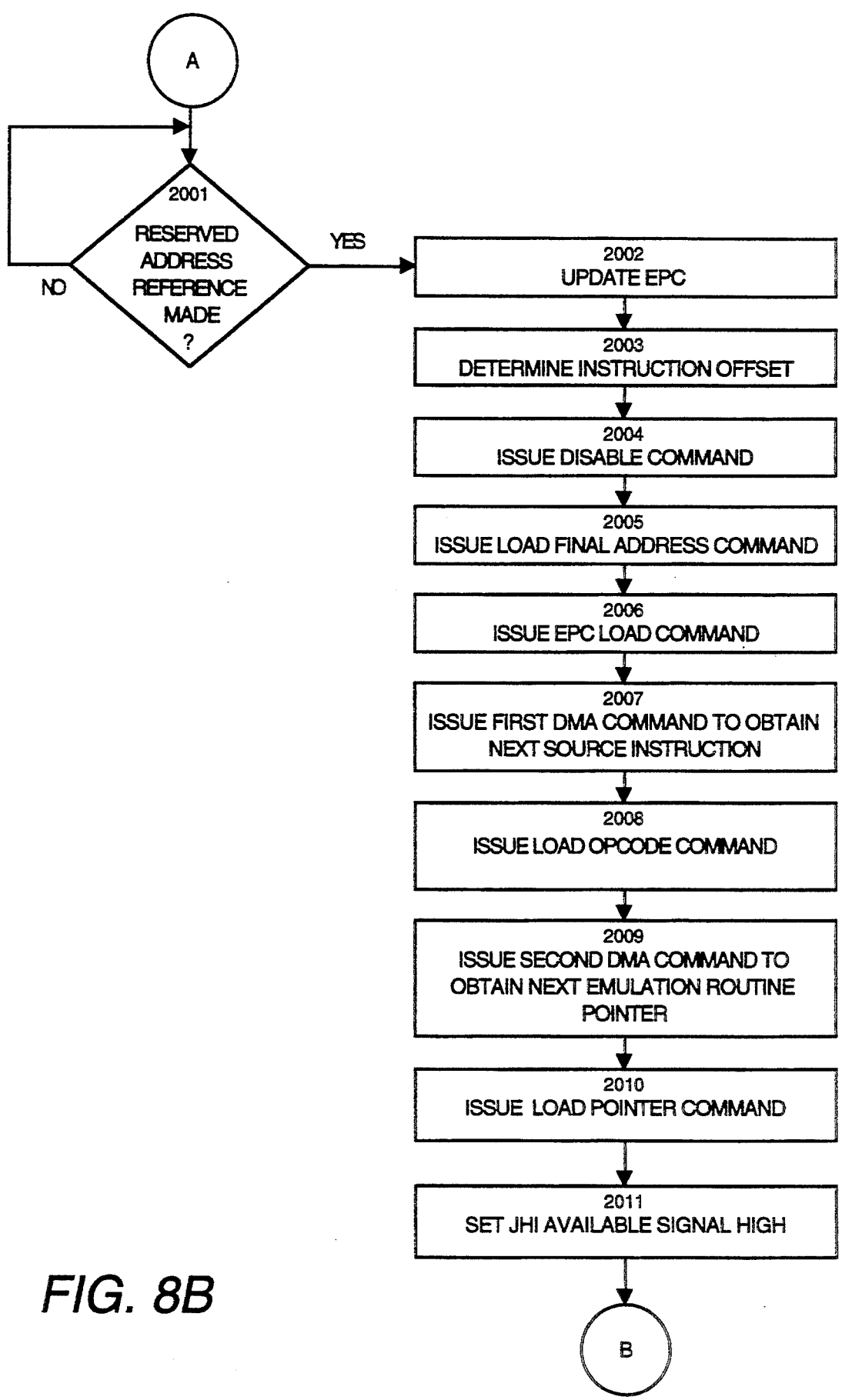

Referring now to FIG. 8, a flowchart of a second and preferred method for emulation routine control transfer is shown. The preferred method begins in step 2000 by beginning the execution of the current emulation routine. Next, the preferred method proceeds to steps 2001, 2013, and 2019 concurrently. In step 2001, the preferred method determines if a reserved address reference has been made corresponding to an EPC update and to an instruction offset signal. If no reserved address reference has been made, the preferred method remains at step 2000. Each emulation routine makes a single reserved address reference during its execution. Once the reserved address reference has been made, the preferred method proceeds to step 2002 and updates the EPC 30. Following step 2002, the preferred method determines in step 2003 the value of the instruction offset signal. The instruction offset signal indicates the address of the final host instruction in the current emulation routine relative to the address of the host instruction that made the reserved address request. Operation continues in step 2004 with the issuance of the load disable command. The load disable command prevents the jump instruction circuit 140 from storing another instruction address after the reserved address reference has been made. Thus, the address stored within the jump instruction circuit 140 after the reserved address has been made is the address of the host instruction that made the reserved address reference. The jump instruction circuit 140 sums this address with the instruction offset signal to create the address of the final host instruction in the currently executing emulation routine. Following step 2004, the preferred method issues the load final address command in step 2005. Next, the preferred method issues an EPC load command in step 2006. Following step 2006, the preferred method issues the first DMA command to prefetch the next source instruction to be emulated, where the EPC 30 is used to indicate the memory read address. After the first DMA operation, the next source instruction is present on the data bus 14. The preferred method next issues the load opcode command in step 2008, causing the opcode storage means 100 to load the next source instruction's opcode. Next, the preferred method issues the second DMA read command in step 2009 to prefetch the pointer to the next emulation routine, where the contents of the opcode storage means 100 are used to indicate the memory read address. After the second DMA operation, the pointer to the next emulation routine is present on the data bus 14. Operation therefore continues in step 2010 with the preferred method issuing the load pointer command. The jump instruction circuit 140 generates the relative address signal from the pointer to the next emulation routine and the address of the final host instruction in the current emulation routine. The relative address signal is then incorporated into the JHI, making the JHI a valid jump to the next emulation routine. In step 2011, the preferred method sets the JHI available signal high, indicating that the JHI is valid. Following step 2011, the preferred method proceeds to step 2014.

In step 2013, the preferred method determines if the execution completion signal has been received. If not, the preferred method remains at step 2013. Receipt of the execution completion signal indicates that the final host instruction in the current emulation routine has been executed and the CPU 3 has issued the next instruction request. Receipt of the execution completion signal causes the preferred method to proceed to step 2014. In step 2014, the preferred method determines if the JHI available signal is high. If not, the preferred method proceeds to step 2015 and routes the wait signal to the instruction bus 20. Following step 2015, the preferred method returns to step 2014. If it was determined in step 2014 that the JHI available signal is high, the preferred method advances directly to step 2016 and routes the JHI to the instruction bus 20. Following step 2016, the preferred method loads the JHI from the instruction bus 20 in step 2023. Next, the preferred method issues the output disable command to the jump instruction circuit 140 in step 2024. The preferred method then resets the JHI available signal in step 2025. Following step 2025, the preferred method issues the load enable command to the jump instruction circuit 140 in step 2026, allowing the jump instruction circuit to store instruction addresses again. After step 2026, the preferred method executes the JHI in step 2027. After step 2027, the preferred method returns to step 2000, thereby transferring control to the next emulation routine.

While the present invention has been described with reference to certain preferred embodiments, those skilled in the art will recognize that various modifications may be provided. For example, modifications might include, but would not be limited to an alternate embodiment of the present invention, where the final host instruction within the current emulation can be indicated by decoding a reserved address reference to produce the appropriate EPC increment, and the data stored at the reserved address can be used to indicate the address of the final host instruction within the emulation routine relative to the host instruction making the reserved address reference. In this case, the emulation routine control transfer apparatus must retrieve the data stored at the reserved address as an additional step. Similarly, in another alternate embodiment, the decoding could be used to indicate the address of the final host instruction in the emulation routine, and the contents stored at the reserved address could be used to store the appropriate EPC increment. In yet another alternate embodiment, each emulation routine's final host instruction is constrained to occur at a recognizable address boundary. This in turn requires that each emulation routine have a predetermined size. In this case, each host instruction address can be interpreted as having a starting address portion plus an offset portion. If the address of at least one host instruction is known prior to the execution of the final host instruction in the current emulation routine, the starting address portion can be extracted from the known address and added to the predetermined emulation routine size to produce the final host instruction address. These and other variations upon and modifications to the preferred embodiments are provided for by the present invention which is limited only by the following claims.

What is claimed is:

1. An apparatus for emulation routine control transfer via host jump instruction creation and insertion, said apparatus for transferring control between a currently executing emulation routine and a next emulation routine on a host computer system having a central processing unit and a memory coupled by a control bus, a data bus, and an address bus, each emulation routine having a starting address corresponding to a first host instruction to be executed within the emulation routine, said apparatus comprising:

an emulated program counter having a control input, a load input, and an output, for storing an address of a next source instruction to be emulated, said emulated program counter storing data from the data bus in response to a first signal on the control input of said emulated program counter, the control input of said emulated program counter coupled to the control bus, the load input of said emulated program counter coupled to the data bus, and the output of said emulated program counter coupled to the address bus;

a pointer storage means having a control input, a data input, and a data output, for storing a pointer to the next emulation routine in response to a second signal on the control input of said pointer storage means, the control input of said pointer storage means coupled to the control bus, the data input of said pointer storage means coupled to the data bus;

a jump instruction circuit having a control input, an address input, a data input, an offset input, and an instruction output for creating a jump instruction to the starting address of the next emulation routine, the control input of said jump instruction circuit coupled to the control bus, the address input of said jump instruction circuit coupled to an instruction address bus, the data input of said jump instruction circuit coupled to the data output of said pointer storage means, and the instruction output of said jump instruction circuit coupled to an instruction bus; and a state machine having a control input, an increment input, an address input, an increment output, a control output, and an offset output, for detecting when said emulated program counter has been updated, for monitoring addresses used by the host computer system, and for controlling the retrieval of a pointer to the next emulation routine to be executed from the memory, the storage of the pointer in said pointer storage means, the creation of the jump instruction, and the assertion of the jump instruction onto the instruction bus after a final host instruction in the currently executing emulation routine has been executed, the control input and the control output of said state machine coupled to the control bus, the increment input of said state machine coupled to the address bus, the address input of said state machine coupled to the instruction address bus, the increment output of said state machine coupled to the data bus, and the offset output of said state machine coupled to the offset input of said jump instruction circuit.

2. The apparatus of claim 1, wherein said state machine comprises:

a decoding circuit having an input, a first decode output, a second decode output, and an acknowledgment output, for detecting an update to said emulated program counter and for generating an increment signal, an instruction offset signal and an acknowledgment signal, the input of said decoding circuit coupled to the address bus, the first decode output coupled to the data bus, the second decode output coupled to said jump instruction circuit for providing the instruction offset signal;

a comparison means having an first input, a second input and an output, for generating an execution complete signal when the signals on the first input of said comparison means and the second input of said comparison means are equal, the first input of said comparison means coupled to the instruction address bus, the second input of said comparison means coupled to said jump instruction circuit; and a control circuit having a first input, a second input, a third input and a command output, for issuing a sequence of commands in response to signals from said decoding circuit and said comparison means, the first input of said control circuit coupled to the acknowledgment output of said decoding circuit, the second input of said control circuit coupled to the output of said comparison means, the third input of said control circuit coupled to the control bus, and the command output coupled to the control bus.

3. The apparatus of claim 2, wherein said decoding circuit is a digital decoder having a plurality of inputs, each of the inputs of the decoder coupled to a respective one of the lines forming the address bus, and wherein the address for said emulated program counter is predetermined, and the decoder output asserts the acknowledgment signal when the predetermined address is on the address bus.

4. The apparatus of claim 2, wherein said comparison means is binary comparator having a plurality of first inputs and a plurality of second inputs;

wherein the each of the first inputs of the comparator is coupled to a respective one of the lines forming the instruction address bus, wherein each of the second inputs of the comparator is coupled to a respective output of said jump instruction circuit for receiving a signal for the address of the last host instruction for the current emulation routine.

5. The apparatus of claim 2, wherein said control circuit comprises combinational logic coupled to form a state machine that sequentially asserts signals on the control bus for the following commands: load final address command, load emulated program counter command, read DMA command, load opcode command, read DMA command, load pointer command, and a jump host instruction available command.

6. The apparatus of claim 2, wherein said control circuit comprises combinational logic coupled to form a state machine that sequentially asserts signals on the control bus for the following commands: load disable command, load final address command, load emulated program counter command, read DMA command, load opcode command, read DMA command, load pointer command, jump host instruction available command, output enable command, output disable command, jump host instruction not available command, and load enable command.

7. An apparatus for emulation routine control transfer via host jump instruction creation and insertion, said apparatus for transferring control between a currently executing emulation routine and a next emulation routine on a host computer system having a central processing unit and a memory coupled by a control bus, a data bus, and an address bus, each emulation routine having a starting address corresponding to a first host instruction to be executed within the emulation routine, said apparatus comprising:

an emulated program counter having a control input, a load input, and an output, for storing an address of a next source instruction to be emulated, said emulated program counter storing data from the data bus in response to a first signal on the control input of said emulated program counter, the control input of said emulated program counter coupled to the control bus, the load input of said emulated program counter coupled to the data bus, and the output of said emulated program counter coupled to the address bus;

a pointer storage means having a control input, a data input, and a data output, for storing a pointer to the next emulation routine in response to a second signal on the control input of said pointer storage means, the control input of said pointer storage means coupled to the control bus, the data input of said pointer storage means coupled to the data bus;

a state machine having a control input, an increment input, an address input, an increment output, a control output, and an offset output, for detecting when said emulated program counter has been updated, for monitoring addresses used by the host computer system, and for controlling the retrieval of a pointer to the next emulation routine to be executed from the memory, the storage of the pointer in said pointer storage means, the creation of a jump host instruction, and the assertion of the jump host instruction onto an instruction bus after a final host instruction in the currently executing emulation routine has been executed, the control input and the control output of said state machine coupled to the control bus, the increment input of said state machine coupled to the address bus, the address input of said state machine coupled to an instruction. address bus, the increment output of said state machine coupled to the data bus; and a jump instruction circuit having a control input, an address input, a data input, an offset input, and an instruction output for creating a jump instruction to the starting address of the next emulation routine, the control input of said jump instruction circuit coupled to the control bus, the address input of said jump instruction circuit coupled to the instruction address bus, the data input of said jump instruction circuit coupled to the data output of said pointer storage means, the offset input of said jump instruction circuit coupled to the offset output of said state machine, and the instruction output of said jump instruction circuit coupled to the instruction bus, said jump instruction circuit comprising:

an address storage means having a data input, a control input, and an output for storing the address of the next instruction the CPU is to execute when a referenced address request is on the instruction address bus, the data input of said address storage means coupled to the address bus;

a control signal decoder having an input and an output for controlling the storage of addresses in said address storage means, the input of said control signal decoder coupled to the control bus, and the output of the control decoder coupled to the control input of said address storage means;

a summing means having a control input, a first input, a second input, and an output, for generating the address of the final host instruction in the current emulation routine, the control input of said summing means coupled to the control bus, the first input of said summing means coupled to the output of said address storage means, the second input of said summing means coupled to said state machine for receiving an instruction offset signal, and the output of said summing means providing a final address output to said state machine; and an opcode concatenation means having an input and an output for concatenating a jump host opcode to a relative address signal to produce a jump host instruction, the input of said opcode concatenation means coupled to the output of said pointer storage means, the output of said opcode concatenation means coupled to the instruction bus.

8. The apparatus of claim 7, further comprising a signal selection means having a first input, a second input, a selection input, an enable input, and an output that can be selectively enabled or disabled, for selectively passing one from the group of a wait signal, the jump host instruction, and no signal in response to an execution complete signal, the first input coupled to the output of said opcode concatenation means, the second input coupled to receive a wait signal, the selection input coupled to said state machine, the enable input coupled to the control bus and the output coupled to the instruction bus.

9. An apparatus for emulation routine control transfer via host jump instruction creation and insertion, said apparatus for transferring control between a currently executing emulation routine and a next emulation routine on a host computer system having a central processing unit and a memory coupled by a control bus, a data bus, and an address bus, each emulation routine having a starting address corresponding to a first host instruction to be executed within the emulation routine, said apparatus comprising:

an emulated program counter having a control input, a load input, and an output, for storing an address of a next source instruction to be emulated, said emulated program counter storing data from the data bus in response to a first signal on the control input of said emulated program counter, the control input of said emulated program counter coupled to the control bus, the load input of said emulated program counter coupled to the data bus, and the output of said emulated program counter coupled to the address bus;

a pointer storage means having a control input, a data input, and a data output, for storing a pointer to the next emulation routine in response to a second signal on the control input of said pointer storage means, the control input of said pointer storage means coupled to the control bus, the data input of said pointer storage means coupled to the data bus;

a state machine having a control input, an increment input, an address input, an increment output, a control output, and an offset output, for detecting when said emulated program counter has been updated, for monitoring addresses used by the host computer system, and for controlling the retrieval of a pointer to the next emulation routine to be executed from the memory, the storage of the pointer in said pointer storage means, the creation of a jump host instruction, and the assertion of the jump host instruction onto an instruction bus after a final host instruction in the currently executing emulation routine has been executed, the control input and the control output of said state machine coupled to the control bus, the increment input of said state machine coupled to the address bus, the address input of said state machine coupled to an instruction address bus, the increment output of said state machine coupled to the data bus; and a jump instruction circuit having a control input, an address input, a data input, an offset input, and an instruction output for creating a jump instruction to the starting address of the next emulation routine, the control input of said jump instruction circuit coupled to the control bus, the address input of said jump instruction circuit coupled to the instruction address bus, the data input of said jump instruction circuit coupled to the data output of said pointer storage means, the offset input of said jump instruction circuit coupled to the offset output of said state machine, and the instruction output of said jump instruction circuit coupled to the instruction bus, said jump instruction circuit comprising:

an address storage means having a data input, a control input, and an output for storing the address of the next instruction that the CPU is to execute when a referenced address request is on the instruction address bus, the data input of said address storage means coupled to the address bus;

a control signal decoder having an input and an output for controlling the storage of addresses in said address storage means, the input of said control signal decoder coupled to the control bus, and the output of the control decoder coupled to the control input of said address storage means;

a summing means having a control input, a first input, a second input, and an output, for generating the address of the final host instruction in the current emulation routine, the control input of said summing means coupled to the control bus, the first input of said summing means coupled to the output of said address storage means, the second input of said summing means coupled to said state machine for receiving an instruction offset signal, and the output of said summing means providing a final address output to said state machine;

a subtracting means having a first input, a second input, and an output, for generating a relative jump signal that indicates the address of the next emulation routine relative to the value of a host program counter after execution of a final host instruction in the current emulation routine, the first input of said subtracting means coupled to the output of said summing means, and the second input of said subtracting means coupled to the output of said pointer storage means;

an opcode concatenation means having an input and an output for concatenating a jump host opcode to a relative address signal to produce a jump host instruction, the input of said opcode concatenation means coupled to the output of said subtracting means; and a signal selection means having a first input, a second input, a selection input, an enable input, and an output that can be selectively enabled or disabled, for selectively passing one from the group of a wait signal, a jump host instruction and no signal in response to an execution complete signal, the first input of said signal selection means coupled to the output of said opcode concatenation means, the second input of said signal selection means coupled to receive a wait signal, the selection input of said signal selection means coupled to said state machine, the enable input of said signal selection means coupled to the control bus and the output of said signal selection means coupled to the instruction bus.

10. The apparatus of claim 9, wherein said control signal decoder decodes the signals present on the control bus for an instruction request issued by the CPU and outputs a load address command; and wherein said control signal decoder monitors and decodes the signals present on the control bus for a load disable signal and a load enable signal and disables the load output upon receipt of the load disable signal until the load enable signal is received.

11. The apparatus of claim 9, wherein said summing means preferably comprises an adder with its output coupled to a register.

12. A method for emulation routine control transfer via host jump instruction creation and insertion, for transferring control between a currently executing emulation routine and a next emulation routine on a host computer system having a central processing unit and a memory coupled by a control bus, a data bus, an instruction address bus, and an address bus, each emulation routine corresponding to a source instruction and comprising a set of host instructions stored beginning at a starting address, the set of host instructions including a final host instruction, said method comprising the steps of:

beginning execution of a current emulation routine on said central processing unit;

during execution of the current emulation routine, storing an address for a next source instruction to be emulated in an emulated program counter;

during execution of the current emulation routine, performing at least one of the following steps:

retrieving the next source instruction from said memory using the address stored in said emulated program counter;

retrieving a pointer to the next emulation routine from said memory using the next source instruction retrieved;

storing the pointer to the next emulation routine in a pointer storage means;

generating a jump host instruction using the pointer stored in said pointer storage means, the jump host instruction corresponding to the starting address of the next emulation routine;

monitoring the instruction address bus to determine whether an address present upon the instruction address bus corresponds to the address of the final host instruction within the current emulation routine, thereby determining when the execution of the current emulation routine is complete; and outputting the jump host instruction on the instruction bus to transition between the current emulation routine and the next emulation routine.

13. The method of claim 12, further comprising the following steps during execution of the current emulation routine:

monitoring the control bus for a signal to load said emulated program counter; and detecting a signal to load said emulated program counter.

14. The method of claim 16, wherein the steps of retrieving the next source instruction and retrieving a pointer are direct memory access read operations; and wherein a plurality of bits of the next source instruction is used to indicate a memory location corresponding to the next emulation routine pointer.

15. The method of claim 12 further comprising the step of loading a next source instruction opcode into an opcode storage means after the step of retrieving the next source instruction from the memory.

16. The method of claim 14, wherein the step of retrieving a pointer to the next emulation routine uses the value within said opcode storage means as a memory read address.

17. A method for emulation routine control transfer via host jump instruction creation and insertion, for transferring control between a currently executing emulation routine and a next emulation routine on a host computer system having a central processing unit and a memory coupled by a control bus, a data bus, an instruction address bus, and an address bus, each emulation routine corresponding to a source instruction and comprising a set of host instructions stored beginning at a starting address, the set of host instructions including a final host instruction, said method comprising the steps of:

beginning execution of a current emulation routine on said central processing unit;

during execution of the current emulation routine, storing an address for a next source instruction to be emulated in an emulated program counter;

during execution of the current emulation routine, performing at least one of the following steps:

retrieving the next source instruction from said memory using the address stored in said emulated program counter;

retrieving a pointer to the next emulation routine from said memory using the next source instruction retrieved;

storing the pointer to the next emulation routine in a pointer storage means;

generating a jump host instruction using the pointer stored in said pointer storage means by performing the substeps of:

storing in an address storing means, an address of the next host instruction the CPU is to execute;

determining an offset for the address of the final host instruction of the current emulation routine;

determining the address of the final host instruction for the current emulation routine;

generating a relative address from the pointer to the next emulation routine and address of the final host instruction for the current emulation routine; and concatenating the relative address with a host jump instruction opcode;

monitoring the instruction address bus to determine whether an address present upon the instruction address bus corresponds to the address of the final host instruction within the current emulation routine, thereby determining when the execution of the current emulation routine is complete; and outputting the jump host instruction on the instruction bus to transition between the current emulation routine and the next emulation routine.

18. The method of claim 17 wherein the step of storing in said address storing means occurs prior to the execution of an instruction to reference a reserved address.

19. The method of claim 17 further comprising the steps of:

determining whether a valid jump instruction has been generated;

determining whether the current emulation routine has been completed;

outputting a wait signal on the instruction bus if a valid jump instruction has not been generated and the current emulation routine has been completed;

outputting the jump instruction on the instruction bus if a valid jump instruction has been generated and the current emulation routine has been completed.

* * * * *